(12) United States Patent
Yamauchi et al.

(10) Patent No.: US 7,665,738 B2
(45) Date of Patent: Feb. 23, 2010

(54) SELF-TIGHTENING TYPE SEALING DEVICE

(75) Inventors: Takanori Yamauchi, Takasago (JP);
Yasuo Manabe, Takasago (JP); Takeo Nishimoto, Takasago (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 1284 days.

(21) Appl. No.: 10/944,795

(22) Filed: Sep. 21, 2004

(65) Prior Publication Data
US 2005/0077686 A1    Apr. 14, 2005

(30) Foreign Application Priority Data
Oct. 10, 2003    (JP)    ............... 2003-352780

(51) Int. Cl.
*F16J 15/02*    (2006.01)
(52) U.S. Cl. ............... 277/328; 277/511; 277/513
(58) Field of Classification Search ............... 277/328, 277/510–511, 513, 516
See application file for complete search history.

(56) References Cited

U.S. PATENT DOCUMENTS

| | | | | |
|---|---|---|---|---|
| 448,874 A | * | 3/1891 | Brewer | ............... 277/308 |
| 1,324,775 A | * | 12/1919 | Anathor-Henriksen | ....... 384/16 |
| 4,381,868 A | * | 5/1983 | Croy et al. | ............... 277/328 |
| 5,908,046 A | * | 6/1999 | Mosman | ............... 137/312 |

FOREIGN PATENT DOCUMENTS

| | | |
|---|---|---|
| JP | 61-170766 | 10/1986 |
| JP | 4-104298 | 9/1992 |
| JP | 11-51242 | 2/1999 |

OTHER PUBLICATIONS

Mitsue Koizumi, et al. "Isotopic Pressing Technique", Apr. 13, 1988; pp. 287-296.

* cited by examiner

*Primary Examiner*—Vishal Patel
(74) *Attorney, Agent, or Firm*—Oblon, Spivak, McClelland, Maier & Neustadt, L.L.P.

(57) ABSTRACT

In a self-tightening type sealing device according to the present invention, not only a sealing member is tightened by an internal pressure, but also a tightening force imparting device which tightens the sealing member separately from the internal pressure is provided so as to be remotely operable by a controller. This construction remedies drawbacks involved in manual operation of the tightening force imparting device.

13 Claims, 5 Drawing Sheets

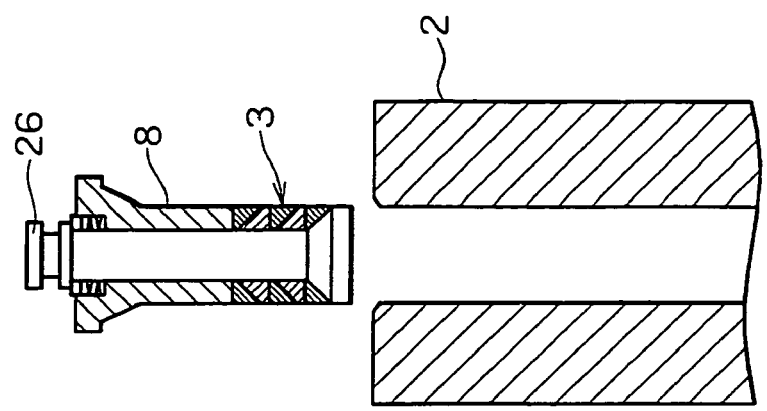
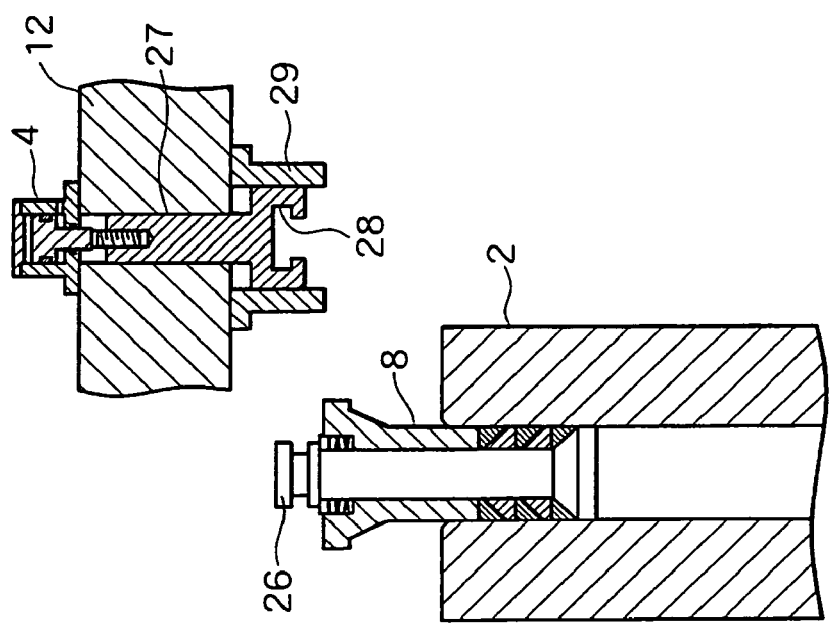
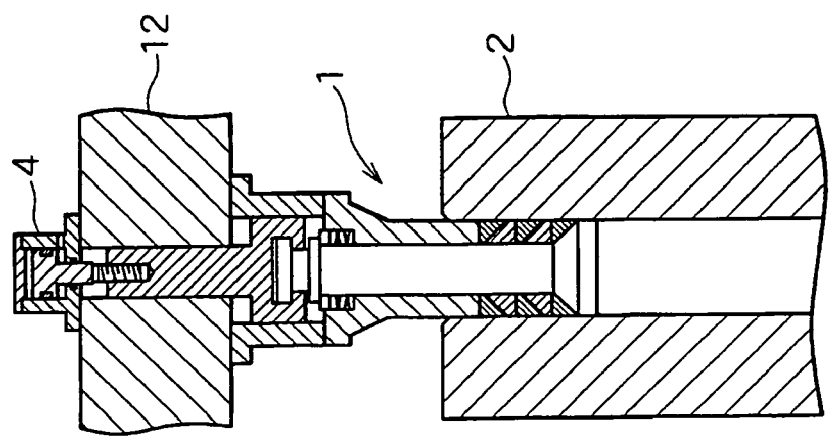

SELF-TIGHTENING TYPE SEALING DEVICE

BACKGROUND OF THE INVENTION

1. Field of the Invention

The present invention relates to a self-tightening type sealing device and an isotropic pressing apparatus.

2. Description of the Related Art

A self-tightening sealing device is known as a device based on the technique of sealing fluid in a high-temperature ultra-high pressure apparatus with use of such a movable member as a piston. According to this known self-tightening sealing technique, a higher seal is created on a sealing surface by utilizing an internal pressure. Those described in "Isotropic Pressing Technique" (written by Mitsue KOIZUMI, et al., The Nikkan Kogyo Shinbun, Ltd., published Apr. 13, 1988, p. 287~296) and Japanese Utility Model Laid Open Publication No. 170766/1986 are publicly known.

According to the conventional technique described in the above "Isotropic Pressing Technique," in a self-tightening type sealing device in which a sealing member is tightened with an internal pressure, a tightening force imparting device for tightening the sealing member is used separately from the internal pressure. A tightening nut has been adopted as the said tightening force imparting device.

According to the technique described in the above Japanese Utility Model Laid Open Publication No. 170766/1986, a spring mechanism is attached to the tightening nut to compensate for the abrasion of the sealing member.

In the above conventional techniques, in order to obtain an initial seal in a low pressure region stably, it is necessary to manually tighten the tightening nut strongly. However, if the strongly tightened state is left as it is, it becomes very difficult to insert or remove the self-tightening type sealing device into or from a pressure vessel or a cylinder.

According to the above conventional techniques, in view of the point just mentioned above, the tightening nut is loosened manually in the device inserting or removing operation. However, in an isotropic pressing apparatus or the like in which the above inserting and removing operations are performed frequently, adjustment of the tightening force of the tightening nut by manual operation is very troublesome.

Further, in the type wherein a lowering of the tightening force caused by wear or deformation is compensated for using a spring mechanism, the range of the compensation is narrow and therefore, in the case of occurrence of wear or the like exceeding the compensation limit, it is necessary to make adjustment again using a tightening nut.

SUMMARY OF THE INVENTION

Accordingly, it is an object of the present invention to provide a self-tightening type sealing device and an isotropic pressing apparatus free of the drawbacks involved in manual operation of the tightening force imparting device.

The present invention has adopted the following means for achieving the above-mentioned object. That is, in a self-tightening type sealing device for sealing a sealing member with an internal pressure, a feature of the present invention resides in that a tightening force imparting device for tightening the sealing member is provided remotely operably by a controller and separately from the internal pressure.

The remote operation does not mean an actual operation from a remote place which is remote in distance, but means that the tightening force imparting device can be operated from the exterior of the self-tightening sealing device.

According to the present invention, the tightening force of the sealing member can be adjusted by remote operation, so by loosening the said tightening force by remote operation at the time of inserting or removing the self-tightening type sealing device into or from a pressure vessel or a cylinder, the inserting and removing operation becomes easier than the conventional manual operation.

More specifically, according to the present invention there is provided the self-tightening type sealing device fitted in an opening which is for communication between a high pressure chamber formed in the interior of a pressure vessel and the exterior of the pressure vessel to seal the opening by an internal pressure of the pressure vessel, the self-tightening type sealing device comprising a plug member inserted removably into the opening; a pushing member inserted through a axis portion of the plug member so as to be axially relatively movable with respect to the plug member, one end portion on the high pressure chamber side of the pushing member serving as a pressure bearing portion for bearing an internal pressure of the high pressure chamber; the sealing member held axially grippingly by the pushing member and the plug member to seal the opening; a tightening force imparting device for tightening the sealing member separately from the internal pressure; and a controller for remotely operating the tightening force imparting device.

The tightening force imparting device can be constructed so as to act on the plug member and the pushing member and impart a gripping force to the sealing member.

According to the present invention constructed as above, the gripping force for the sealing member can be adjusted by remote operation, so if the gripping force is weakened at the time of removing the plug member from the opening, the removing operation becomes easier. If the gripping force for the sealing member is increased by remote operation after insertion of the plug member into the opening, an initial sealing in a low pressure region is effected effectively.

In case of wear of the sealing member, the gripping force can be adjusted arbitrarily by remote operation.

Separately from the tightening force imparting device, a spring mechanism may be provided which acts on the plug member and the pushing member to impart an initial gripping force to the sealing member. With the spring mechanism, a minimum gripping force can be imparted to the sealing member.

It is preferable that the tightening force imparting device be constituted by a fluid pressure cylinder comprising a cylinder and a piston, that the piston act on the pushing member and the cylinder act on the plug member, and that the controller controls a fluid pressure to be fed to the fluid pressure cylinder.

It is preferable that the tightening force imparting device be provided removably with respect to the plug member and the pushing member.

According to the present invention, the tightening force of the sealing member can be adjusted by remote operation and therefore the operation for inserting and removing the self-tightening type sealing device into and from such as a pressure vessel becomes easier.

The present invention can be utilized in the high-temperature ultra-high pressure processing industry using HIP apparatus or the like.

BRIEF DESCRIPTION OF THE DRAWINGS

FIG. 4 is a diagram explaining the operation of the device shown in FIG. 3; and

DETAILED DESCRIPTION OF THE PREFERRED EMBODIMENTS

Embodiments of the present invention will be described hereinunder with reference to the accompanying drawings.

Figure 1:
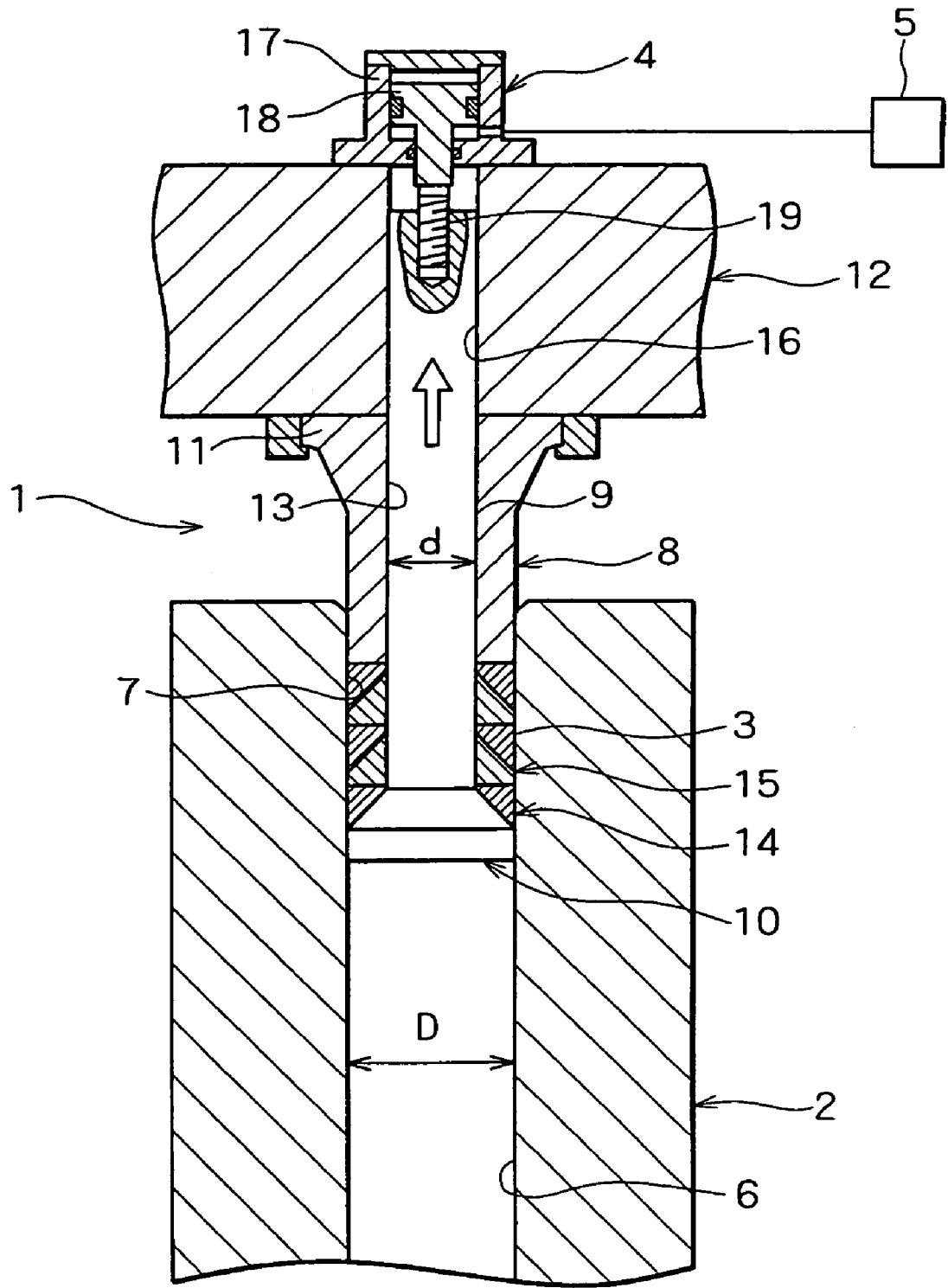
FIG. 1 is a sectional view showing a self-tightening type sealing device according to an embodiment of the present invention.

FIG. 1 illustrates a self-tightening type sealing device 1 according to an embodiment of the present invention. The self-tightening type sealing device 1 includes a sealing member 3 which is tightened by an internal pressure of a pressure vessel 2 for example. Separately from this internal pressure, a tightening force imparting device 4 for tightening the sealing member 3 is provided remotely operably by a controller 5.

The pressure vessel 2 includes a high pressure chamber 6 formed in the interior of the vessel and an opening portion 7 which provides communication between the high pressure chamber 6 and the exterior. A plug member 8 is inserted into the opening portion 7 removably. A pushing member 9 is provided through an axis portion of the plug member 8. The pushing member 9 is inserted into the plug member 8 so as to be axially relatively movable with respect to the plug member 8. One end portion (the lower end portion in FIG. 1) of the pushing member 9 projects from the plug member 8 and this projecting end portion serves as a pressure bearing portion 10 for bearing the internal pressure of the high pressure chamber 6.

The sealing member 3 is axially held grippingly by the pressure bearing portion 10 and the plug member 8 to seal the opening portion 7.

The tightening force imparting device 4 acts on the plug member 8 and the pushing member 9 to impart a gripping force to the sealing member 3.

More specifically, the pressure vessel 2 is formed in the shape of a thick-walled cylinder. The high pressure chamber 6 formed in the interior of the pressure vessel 2 is in a circular sectional shape having a diameter of D, and the opening portion 7 is also formed at the same diameter as the high pressure chamber 6.

The plug member 8 is formed in a columnar shape, with a flange portion 11 of a larger diameter being formed at one end portion (the upper end potion in FIG. 1) of the plug member 8. The flange portion 11 is secured to a pressing crosshead 12. The pressing crosshead 12 functions to insert and remove the plug member 8 into and from the opening portion 7 and press the plug member 8 when inserted into the opening portion 7 to increase the internal pressure of the high pressure chamber 6 to an ultra-high pressure.

An opposite end portion (the lower end portion in FIG. 1) of the plug member 8 is a portion to be inserted into the opening portion 7 and the diameter thereof is set smaller than the diameter D of the opening portion 7. A lower end face of the plug member 8 is formed as a plane which is orthogonal to the axis of the plug member 8. A through hole 13 having a diameter of d is formed axially through the axis of the plug member 8.

The diameter of the pressure bearing portion 10 of the pushing member 9 is smaller than the diameter D of the opening portion 7 and larger than the diameter d of the through hole 13. An upper surface of the pressure bearing portion 10 is tapered. The tapered angle of this tapered surface is set at 90° (45° right and left relative to a perpendicular).

The tapered surface and the lower end face of the plug member 8 are spaced a predetermined distance from each other. The sealing member 3 is provided in this spacing.

The sealing member 3 is constituted by a combination of a mitering packing 14 of 45° and a backup ring 15. The mitering packing 14 may be substituted by a flat packing.

The angle of the packing is not limited to 45°.

An upper end of the pushing member 9 projects upward beyond an upper end of the plug member 8 and is positioned within a through hole 16 formed in the pressing crosshead 12.

The tightening force imparting device 4 is provided on an upper surface of the pressing crosshead 12 and is connected to an upper end of the pushing member 9. The tightening force imparting device 4 is constituted by a fluid pressure cylinder which comprises a cylinder 17 and a piston 18 received within the cylinder 17 vertically movably. A lower end of a piston rod 19 is threadedly engaged with the upper end of the pushing member 9 so that the piston 18 acts on the pushing member 9. Further, the cylinder 17 is secured to the upper surface of the pressing crosshead 12 so that the cylinder 17 acts on the plug member 8.

The fluid pressure cylinder in the tightening force imparting device 4 is a single-acting cylinder, to which the controller 5 is connected. A fluid pressure is supplied to a lower chamber of the piston 18 by the controller 5, whereby the pushing member 9 is pulled upward to impose a load F on the sealing member 3 to tighten the sealing member 3. Control is made by the controller 5 so that the fluid pressure is removed to force down the pushing member 9 and thereby remove the load F. The controller 5 is constructed so that the load F can be set arbitrarily by pressure controlling the fluid pressure. These cylinder operation and fluid pressure control are performed by remote operation.

Hydraulic pressure is used as the fluid pressure, but no limitation is made thereto. The fluid pressure may be pneumatic pressure. The fluid pressure cylinder is not limited to a single-acting type, but may be a double-acting type.

According to this embodiment constructed as above, at the time of inserting or removing the plug member 8 through the opening portion 7 of the pressure vessel 2, the load F applied by the tightening force imparting device 4 is removed. After the plug member 8 is inserted into the opening portion 7, the load F is imparted to the pushing member 9 from the tightening force imparting device 4 by remote operation. At this time, a surface pressure of $F/\{(D^2-d^2)\pi/4\}$ is applied to the sealing member 3, and in the mitering packing 14, a sealing pressure almost equal to that surface pressure is developed on the wall surface of the opening portion 7 by elasticity for example.

The pressure of the high pressure chamber 6 is increased by pushing the plug member 8 into the high pressure chamber 6 with the pressing crosshead 12. If this pressing load is assumed to be P, $P/\{D^2\pi/4\}$ is obtained as a generated pressure and the sealing surface pressure becomes $(p+F)/\{D^2-d^2)\pi/4\}$.

With the self-tightening type sealing surface pressure alone, it suffices in the high pressure region and therefore, in the high pressure region, the sealing member tightening load F may be removed by remote operation.

Figure 2:
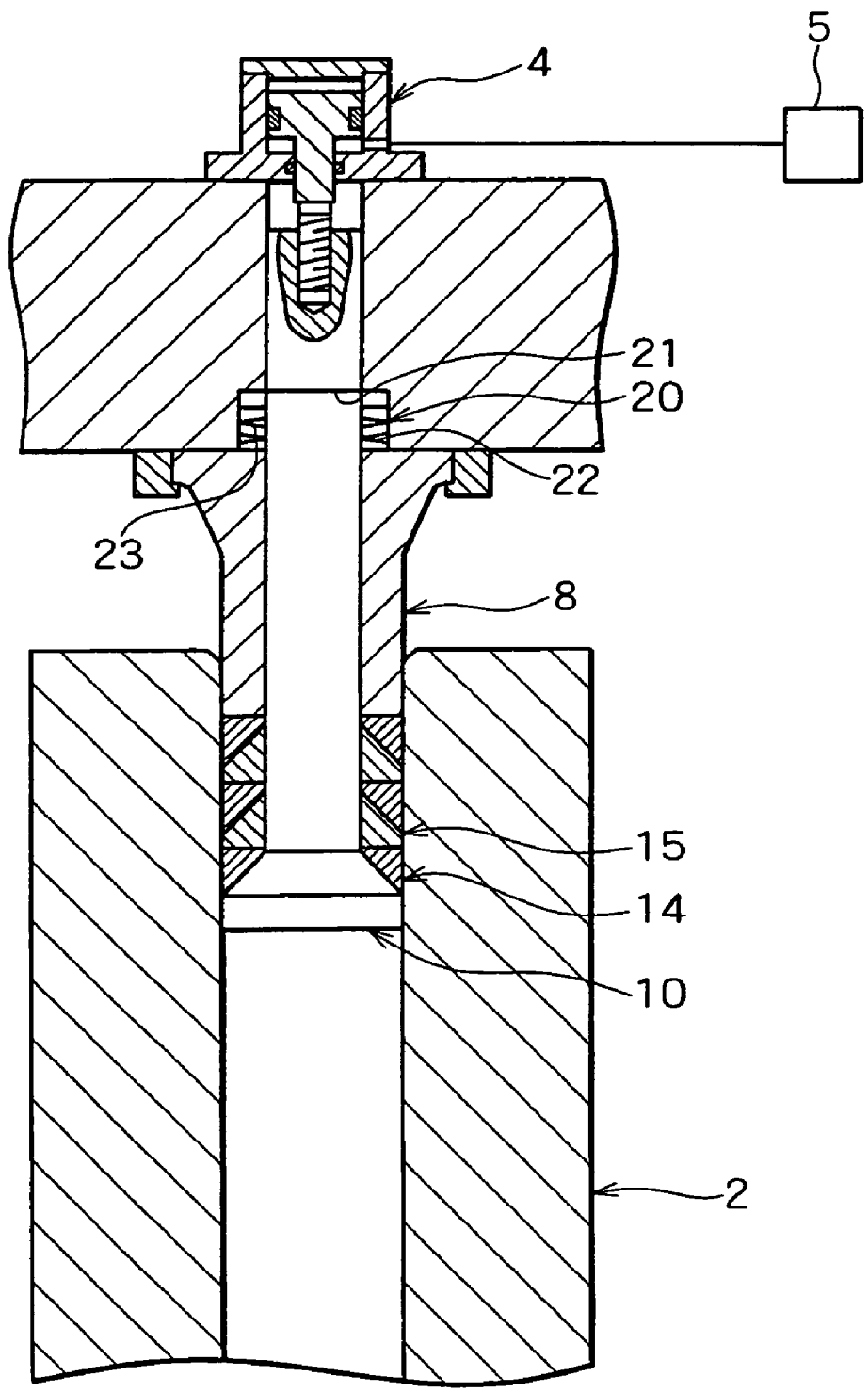
FIG. 2 is a sectional view showing a self-tightening type sealing device according to another embodiment of the present invention.

Referring now to FIG. 2, there is illustrated a self-tightening type sealing device 4 according to another embodiment of the present invention. In this embodiment, a spring mechanism 20 adapted to act on both plug member 8 and pushing member 9 to impart an initial gripping force to the sealing member 3 is provided separately from the tightening force imparting device 4.

The spring mechanism 20 includes plural coned disc springs 22 disposed between a stepped portion 21 formed in an upper portion of the pushing member 9 and an upper end face of the plug member 8. The coned disc springs 22 are accommodated within a large-diameter hole 23 formed in a lower end of the through hole 16 of the pressing crosshead 12. With the coned disc springs 22, the pushing member 9 is urged upward relative to the plug member 8 and imparts an initial tightening force to the sealing member 3.

Figure 3:
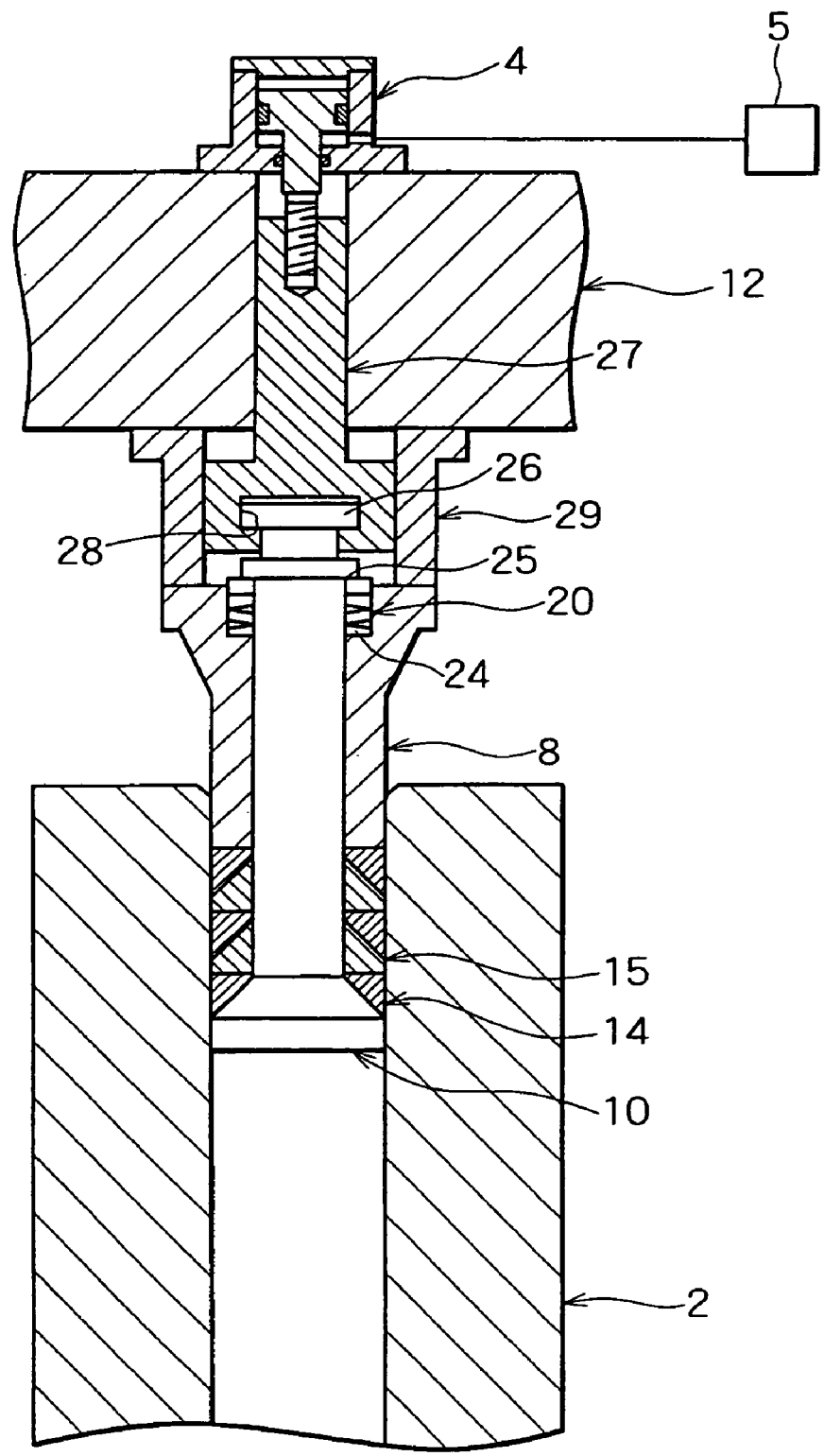
FIG. 3 is a sectional view showing a self-tightening type sealing device according to a further embodiment of the present invention.

Referring now to FIG. 3, there is illustrated a self-tightening type sealing device 4 according to a further embodiment of the present invention, in which the tightening force imparting device 4 is provided removably with respect to the plug member 8 and the pushing member 9.

A spot-faced portion 24 is formed in an upper portion of the through hole 13 of the plug member 8. Coned disc springs 22 are accommodated in the spot-faced portion 24. The upper portion of the pushing member 9 is formed with a flange portion 25, and a lower surface of the flange portion 25 is put in abutment against the coned disc springs 22, to constitute a spring mechanism 20 for urging the pushing member 9 upward.

An engaging portion 26 is integral with the upper end of the pushing member 9. The engaging portion 26 is formed as a T-shaped projecting portion.

A piston connecting rod 27 is screwed to a lower end of the piston rod 19 in the tightening force imparting device 4. A to-be-engaged portion 28 adapted to be engaged disengageably with the engaging portion 26 is formed at a lower end of the piston connecting rod 27. The to-be-engaged portion 28 is formed as a T-shaped groove for engagement with the T-shaped engaging portion 26.

A pressing stem 29 which houses therein the piston connecting rod 27 is fixed to a lower surface of the pressing crosshead 12. The device is constructed so that a lower surface of the pressing stem 29 and an upper surface of the plug member 8 come into abutment against each other disengageably.

FIG. 4 illustrates a step of removing the tightening force imparting device 4 from the plug member 8 and the pushing member 9. In the same figure, FIG. 4A shows a state in which the tightening force imparting device 4 is engaged with the plug member 8 and the pushing member 9, FIG. 4B shows a state in which the pressing crosshead 12 and the pressure vessel 2 are relatively moved to disengage the engaging portion 26 and the to-be-engaged portion 28 from each other, and FIG. 4C shows a state in which the plug member 8 has been taken out from the pressure vessel 2.

Figure 5:
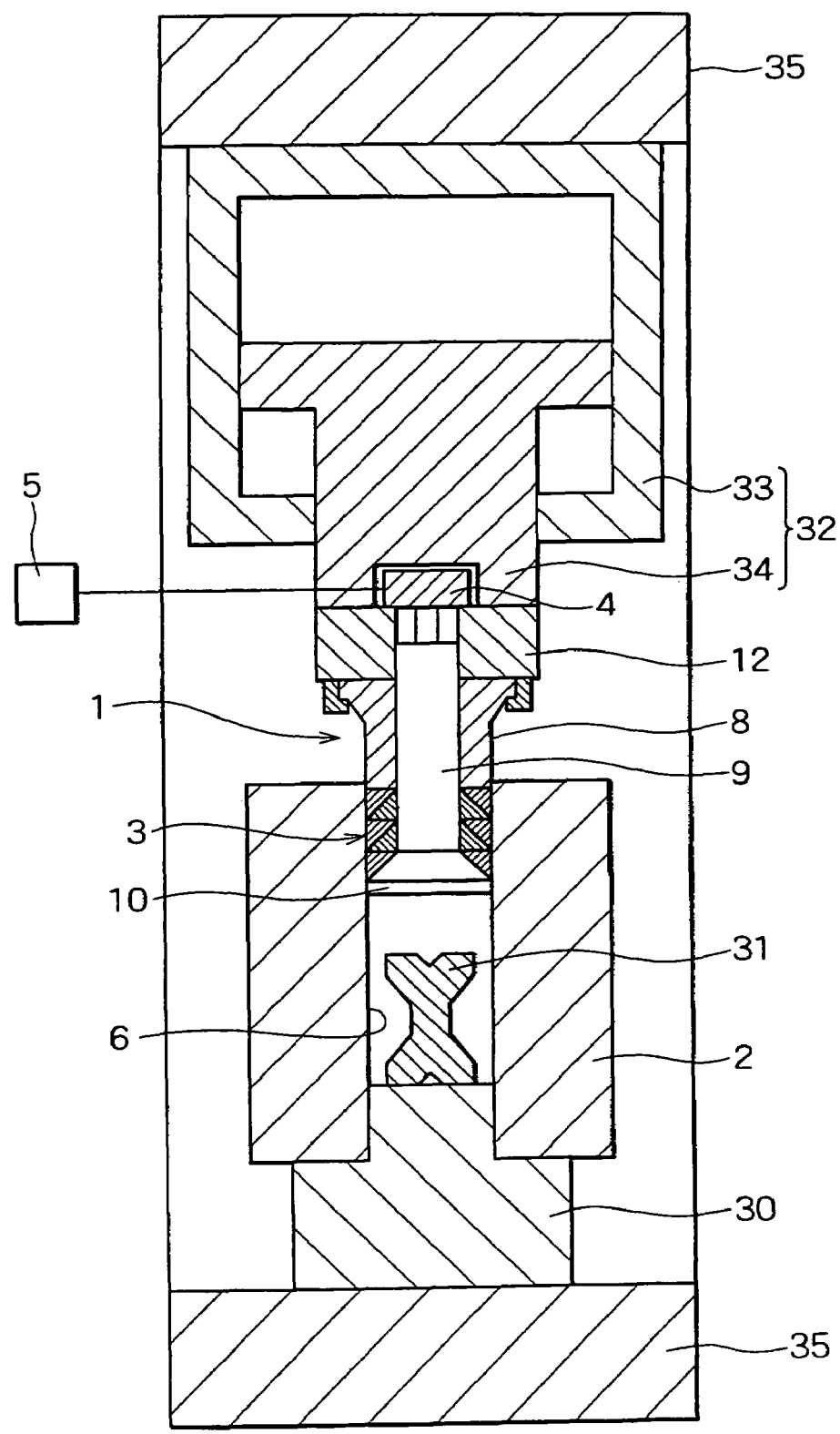
FIG. 5 is a sectional view showing an isotropic pressing device embodying the present invention.

FIG. 5 illustrates an isotropic pressing apparatus embodying the present invention.

The isotropic pressing apparatus includes a cylindrical pressure vessel 2 having upper and lower opening portions 7. The lower opening portion 7 in the pressure vessel 2 is closed with a lower lid 30, while the upper opening portion 7 is closed with a self-tightening type sealing device 1. A high pressure chamber 6 able to accommodate a workpiece 31 is formed in the interior of the pressure vessel 2.

The self-tightening type sealing device 1 has the same construction as that shown in FIG. 1. A pressing device 32 is provided on the upper surface of the pressing crosshead 12. The pressing device 32 is for pushing the plug member 8 into the high pressure chamber 6.

The pressing device 32 is made up of a pressing cylinder 33 and a pressing piston 34 which is received in the pressing cylinder 33 vertically movably. A lower end face of the piston 34 is in abutment against the upper surface of the pressing crosshead 12.

An upper surface of the pressing cylinder 33 and a lower surface of the lower lid 30 are supported by gateway-like frames 35, and an axial force generated in the high pressure chamber 6 is borne by the frames 35.

This isotropic pressing apparatus may be any of hot (HIP), warm, and cold (CIP) isotropic pressing types.

As the self-tightening type sealing device 1 in this isotropic pressing apparatus there may be used one having the spring mechanism 20 which is shown in FIG. 2.

The present invention is not limited to the above embodiments. For example, in case of adopting the conventional tightening nut as the tightening force imparting device, the controller may be one which can rotate the nut. More specifically, an outer periphery portion of the nut may be formed as a worm wheel and there may be adopted a controller having a worm shaft meshing with the worm wheel and driven by a motor.

What is claimed is:

1. A self-tightening type sealing device fitted in an opening portion which is for communication between a high pressure chamber formed in the interior of a pressure vessel and the exterior of said pressure vessel to seal said opening portion by an internal pressure of said pressure vessel, said self-tightening type sealing device comprising:
   a sealing member for sealing said opening portion by the internal pressure of said pressure vessel;
   a tightening force imparting device for imparting a tightening force to said sealing member which is independent of the internal pressure of said pressure vessel; and
   a controller for operating said tightening force imparting device remotely.

2. The self-tightening type sealing device according to claim 1, further comprising:
   a plug member inserted removable into said opening portion; and
   a pushing member inserted through an axis portion of said plug member so as to be axially relatively movable with respect to the plug member, one end portion on a high pressure chamber side of said pushing member serving as a pressure bearing portion for bearing an internal pressure of said pressure vessel,
   wherein said sealing member is held axially grippingly by said pushing member and said plug member to seal said opening portion by the internal pressure of said pressure vessel.

3. The self-tightening type sealing device according to claim 2, wherein said tightening force imparting device is constructed so as to act on said plug member and said pushing member and impart a gripping force to said sealing member.

4. The self-tightening type sealing device according to claim 3, wherein a spring mechanism adapted to act on said plug member and said pushing member and impart an initial gripping force to said sealing member is provided separately from said tightening force imparting device.

5. The self-tightening type sealing device according to claim 3, wherein said tightening force imparting device is constituted by a fluid pressure cylinder comprising a cylinder and a piston, said piston acting on said pushing member and said cylinder acting on said plug member, and said controller controls a fluid pressure to be fed to said fluid pressure cylinder.

6. The self-tightening type sealing device according to claim 3, wherein said tightening force imparting device is provided removably with respect to said plug member and said pushing member.

7. A self-tightening sealing device fittable in an opening portion communicating a high pressure chamber formed in the interior of a pressure vessel and the exterior of said pressure vessel to seal said opening portion, said self-tightening sealing device comprising:
- a sealing member that expands when compressed in a direction perpendicular to the direction of expansion, whereby the sealing member can expand to seal said opening portion when said sealing device is fitted in said opening portion;
- a pressure bearing member having a surface exposed to the internal pressure of said pressure vessel when said sealing device is fitted in said opening portion, whereby a pressure dependent force which corresponds to the internal pressure of said pressure vessel is applied to the pressure bearing member, said pressure bearing member being positioned relative to said sealing member such that the pressure dependent force is applied said sealing member to compress said sealing member in the direction perpendicular to the direction of expansion, whereby the internal pressure of said pressure vessel causes the sealing member to expand to seal said opening portion;
- a tightening force imparting device connected to said pressure bearing member and configured to impart a tightening force having a value independent of the internal pressure of said pressure vessel to said pressure bearing member and said sealing member; and
- a controller that sets said tightening force.

8. The self-tightening sealing device according to claim 7, further comprising a plug member, wherein said sealing member is compressed between said pressure bearing member and said plug member.

9. The self-tightening sealing device according to claim 8, further comprising a pushing member which is moveable relative to said plug member and extends through said plug member, said pushing member having one end connected to said pressure bearing member and having another end applied with said tightening force.

10. The self-tightening sealing device according to claim 9, wherein said tightening force imparting device further imparts said tightening force to said plug member.

11. The self-tightening sealing device according to claim 10, further comprising a spring mechanism adapted to act on said plug member and said pushing member.

12. The self-tightening sealing device according to claim 10, wherein said tightening force imparting device comprises a fluid pressure cylinder device having a piston acting on said pushing member and a cylinder acting on said plug member, wherein said controller controls a fluid pressure to be fed to said fluid pressure cylinder device.

13. The self-tightening sealing device according to claim 12, wherein said pushing member has one portion connected to said pressure bearing member and another portion connected to said fluid pressure cylinder device, wherein said tightening force imparting device is removable with respect to said plug member and said one portion of said pushing member.

* * * * *